S. E. Condon
Dust Pan
No. 74,801   Patented Feb 25, 1868
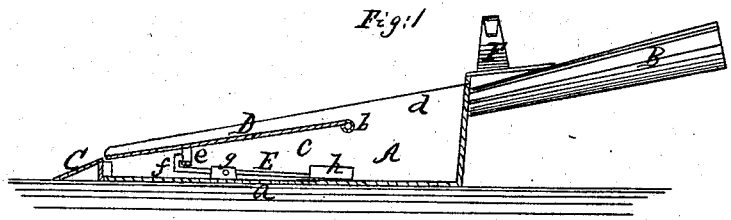
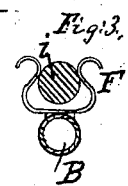
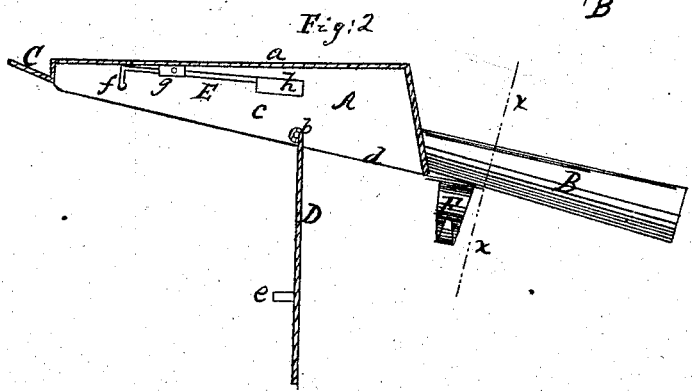
Witnesses.
Theo Tusche
Wm Erwin
Inventor.
S. E. Condon
Per Munn &
Attorneys

SAMUEL E. CONDON, OF BROOKLYN, NEW YORK.

*Letters Patent No. 74,801, dated February 25, 1868.*

IMPROVED DUST-PAN.

*The Schedule referred to in these Letters Patent and making part of the same.*

TO ALL WHOM IT MAY CONCERN:

Be it known that I, SAMUEL E. CONDON, of Brooklyn, E. D., in the county of Kings, and State of New York, have invented a new and improved Dust-Pan; and I do hereby declare that the following is a full, clear, and exact description thereof, which will enable others skilled in the art to make and use the same, reference being had to the accompanying drawings, and to the letters of reference marked thereon.

This invention relates to a new and useful improvement in dust-pans for taking up dust, the sweepings from floors or carpets.

The invention consists in constructing the pan with a hinged or jointed cover, which is provided with a suitable catch or fastening, and so arranged that the lid or cover, when fastened to the pan, forms, in connection with the latter, a chamber or receptacle for the dust, so that the latter may be carried around a building, from room to room, and the pan used and the dust deposited in the chamber until the latter is filled, when the dust-chamber may be readily deprived of its contents, and the sweeping, if not entirely finished, resumed.

The invention further consists in providing the dust-pan with a clamp so arranged that the dust-pan, when not in use, may be secured to the handle of a broom, and the broom and pan always kept together, so as to be ready for use when required. In the accompanying sheet of drawings—

Figure 1 is a side sectional view of my invention in an upright position.

Figure 2, a side sectional view of the same in an inverted position.

Figure 3, a transverse section of the handle, taken in the line $x\,x$, fig. 2.

Similar letters of reference indicate like parts.

A represents the body or main portion of a dust-pan, which may be constructed in the usual manner. B is the handle of the dust-pan, and C is a lip or flange, which is attached to the front edge of the bottom, $a$, of the pan, extends its whole width, and inclines downward, so that its front or outer edge, when the pan is in use, will be in contact with the floor or carpet, (see fig. 1.) D is a lid or cover which extends the whole width of the pan, and has a wire, $b$, fitted in its rear end. This wire projects beyond the sides of the lid or cover, and the ends of the former constitute journals, which have their bearings in the sides, $c\,c$, of the dust-pan, and are allowed to turn freely therein, and form a hinge for the lid or cover. The front end of the lid or cover is in contact with the rear end of the lip or flange C, and said lid or cover extends back to within a short distance of the back of the pan, a space, $d$, being allowed for the dust to pass into the pan. To the under side of the lid or cover D there is attached a staple, $e$, to receive a hook, $f$, at one end of a rod, E, which is pivoted between lugs $g$, on the bottom of the pan. The rear end of this rod E has a weight, $h$, attached, and this weight, when the pan is in any position except an inverted one, has a tendency to keep the hook $f$ in the staple $x$, and secure the lid or cover to the pan, (see fig. 1.)

In using the pan, the latter is placed uprightly on the floor or carpet, as shown in fig. 1, and the dust swept up, over the lid or cover D, into the rear part of the pan, and when one apartment is swept, the pan, with the dust in its chamber, may be carried into another apartment, and that also swept, the dust being retained in the pan, which may be carried in a vertical position, the handle uppermost, if desired.

In order to discharge the dust from the pan, all that is required is simply to invert the latter, so that the gravity of the weight $h$ will draw the hook $f$ from the staple $e$, and the lid or cover will immediately open or drop, as shown in fig. 2, the lid or cover being automatically fastened when the pan is turned over to an upright position.

To the handle B, at a point near the rear of the dust-pan, there is attached a clamp, F, which is simply a strip of sheet metal bent so as to form jaws, and having a requisite degree of elasticity to admit of it being fastened on the broom-handle $i$, as shown in fig. 3. By this simple attachment the dust-pan, when not required for use, may be fitted to the broom-handle whenever required, and the broom and dust-pan always kept together ready for use.

Having thus described my invention, I claim as new, and desire to secure by Letters Patent—

1. The hinged cover D, applied to the dust-pan A, and arranged in connection with the inclined flange C, when a space is left between the hinge of the cover and the rear end of the pan A, and when combined with the automatic coupling, all constructed, arranged, and operating as and for the purpose described.

2. The automatic or self-acting coupling, composed of the pivoted rod E, secured to the bottom of the pan with a hook, $f$, at one end, and a weight, $h$, at the opposite end, and the staple $e$, attached to the under side of the lid or cover D, substantially as and for the purpose specified.

The above specification of my invention signed by me, this 14th day of September, 1867.

SAMUEL E. CONDON.

Witnesses:
    WM. F. McNAMARA,
    J. A. SERVICE.